United States Patent

Padovani

[11] Patent Number: 6,042,360
[45] Date of Patent: Mar. 28, 2000

[54] METHOD AND APPARATUS FOR WITHDRAWING AND PROCESSING THERMOFORMED OBJECTS FROM A THERMOFORMING MACHINE

[75] Inventor: Pietro Padovani, Verona, Italy

[73] Assignee: Isap Omv Group Spa, Verona, Italy

[21] Appl. No.: 08/864,001

[22] Filed: May 27, 1997

[30] Foreign Application Priority Data

May 28, 1996 [IT] Italy .............................. VR96A0052

[51] Int. Cl.[7] .................................................. B29C 51/44
[52] U.S. Cl. .................. 425/403.1; 264/294; 264/297.8; 264/336; 425/436 R; 425/DIG. 201
[58] Field of Search .................................. 425/384, 388, 425/403.1, 437, DIG. 201, 436 R, 436 RM; 264/294, 297.1, 297.8, 322, 336

[56] References Cited

U.S. PATENT DOCUMENTS

| | | | |
|---|---|---|---|
| 3,561,058 | 2/1971 | Komendowski | 425/384 |
| 4,132,319 | 1/1979 | Padovani | 425/403.1 |
| 4,872,826 | 10/1989 | Padovani | 425/403.1 |
| 5,118,277 | 6/1992 | Padovani | 425/384 |
| 5,453,237 | 9/1995 | Padovani | 425/403.1 |

FOREIGN PATENT DOCUMENTS

| | | |
|---|---|---|
| 1 175 178 | 11/1983 | Italy . |
| 1 218 634 | 6/1987 | Italy . |
| 1 257 683 VR | 10/1992 | Italy . |
| 94A000082 | 9/1994 | Italy . |

*Primary Examiner*—Harold Pyon
*Assistant Examiner*—Joseph Leyson
*Attorney, Agent, or Firm*—Ladas & Parry

[57] ABSTRACT

Method and apparatus are disclosed for extracting thermoformed objects from a thermoforming machine and processing them. The apparatus includes one or a sequence of units or treatment or work stations for thermoformed objects produced in the thermoforming machine, arranged in sequence immediately downstream of the thermoforming machine. At least one extractor plate is designed to move synchronously with the thermoforming machine between a withdrawal position in which a set of thermoformed objects are removed from the thermoforming machine and at least one processing station for processing or handling the set of removed objects. And, the at least one extractor plate keeps the removed objects secured to it during the corresponding processing or handling.

16 Claims, 3 Drawing Sheets

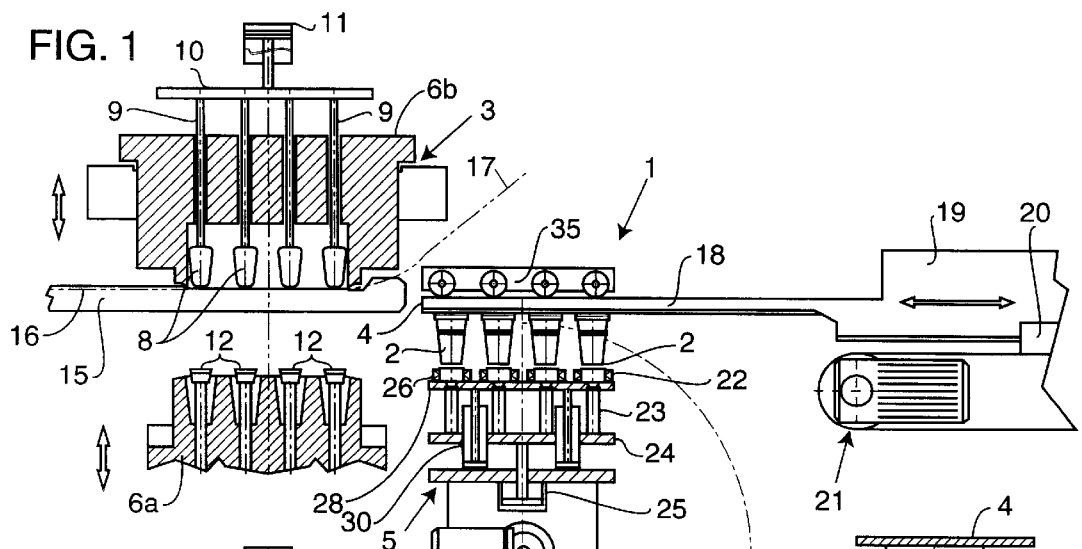
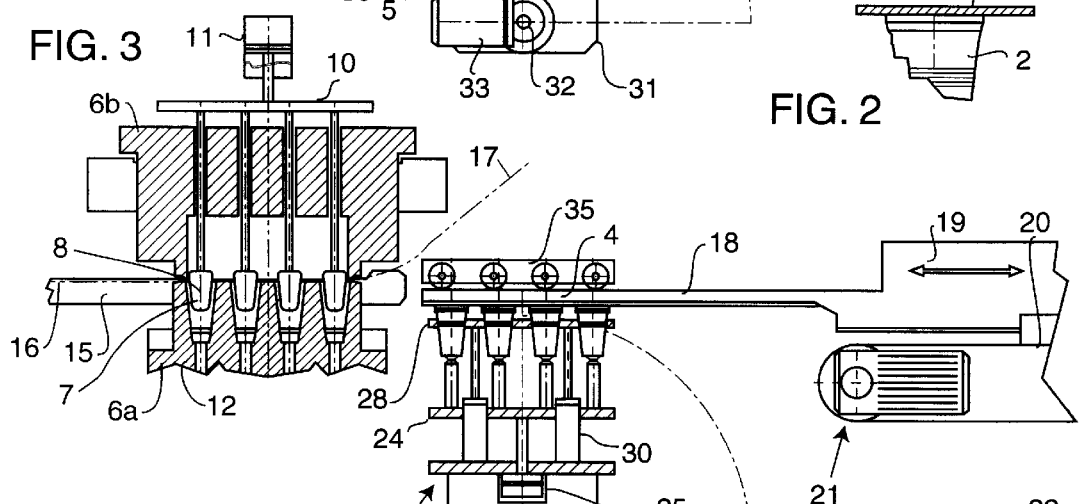
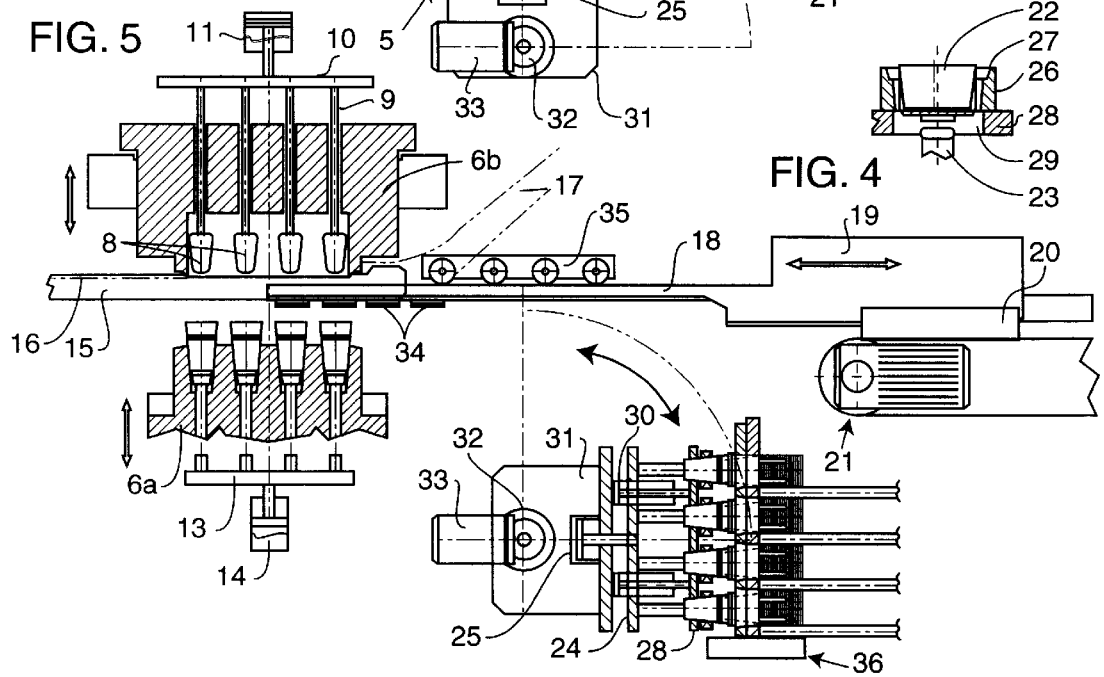

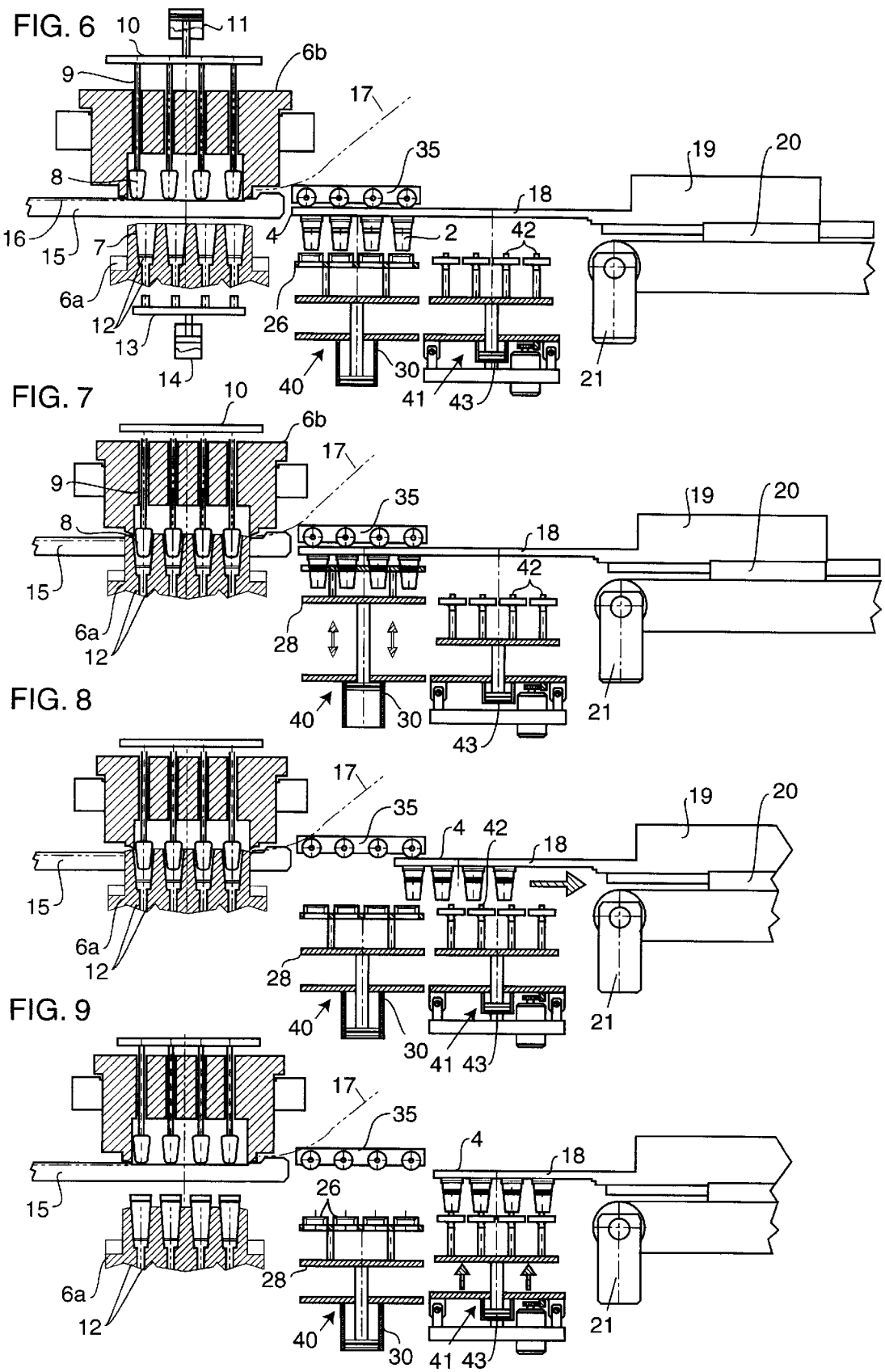

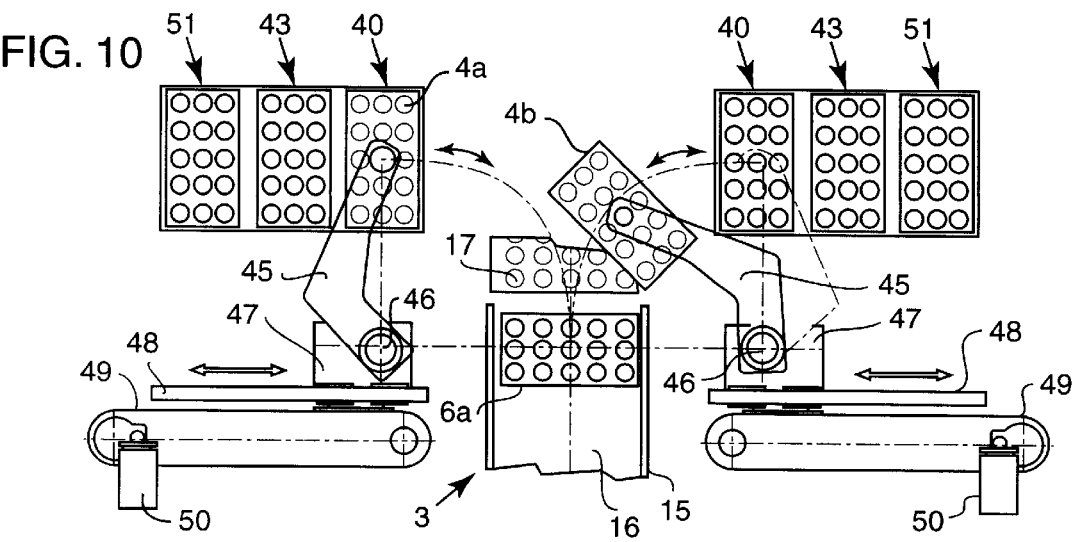
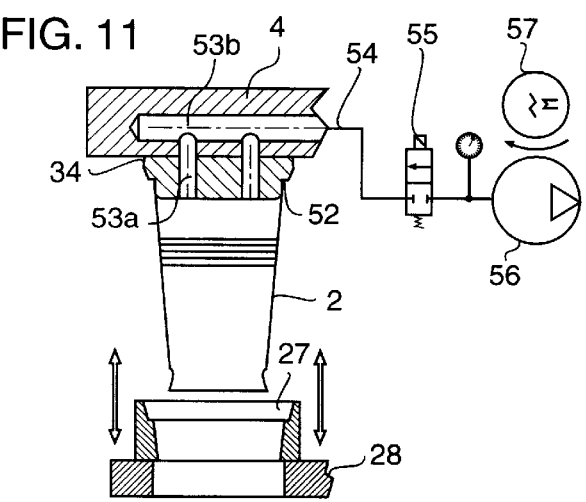
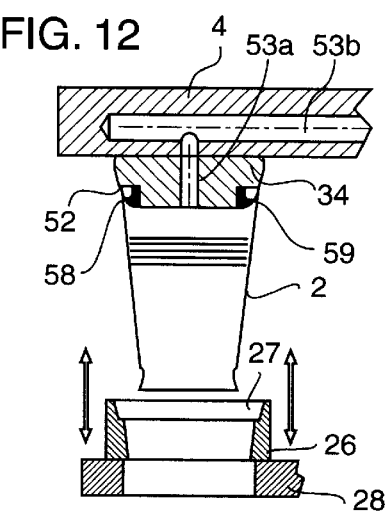
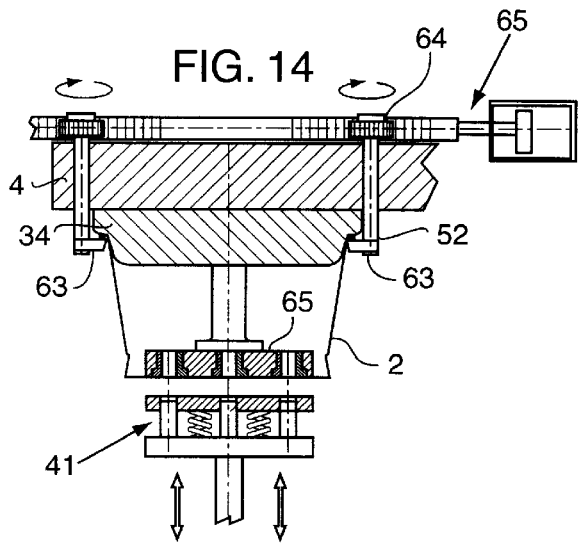
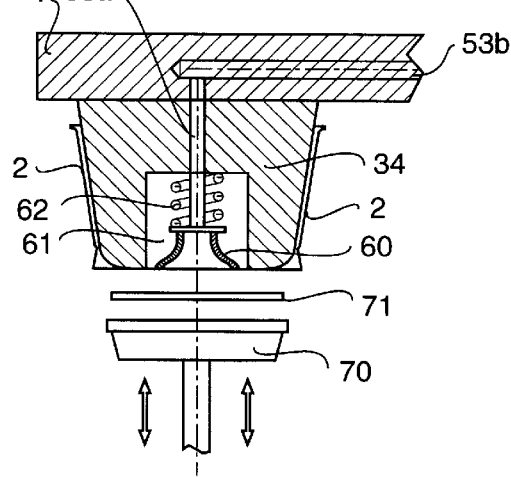

METHOD AND APPARATUS FOR WITHDRAWING AND PROCESSING THERMOFORMED OBJECTS FROM A THERMOFORMING MACHINE

This invention relates to an apparatus for extracting or withdrawing and processing objects thermoformed in a mould of a thermoforming machine from a sheet of thermoformable material.

The extraction of sets of thermoformed objects from the female die of a thermoforming machine or press through the use of a suction plate which is inserted between the male die and the female die during the opening stage of the mould, removes the objects from the mould, usually the female die, and transfers them away from the thermoforming machine, as is disclosed for example in the Applicant's Italian patents nos. 1 175 178 and 1 218 634, or delivers them to a template conveyor on which the objects are subjected to a certain number of processing steps or handling procedures, see the Applicant's Italian patent application VR 92A000092, has already been suggested.

In the case of objects which are thermoformed from rapidly cooling sheet material the time required for extraction of the objects from the mould and for their transfer to a processing or handling station, such as a curling station, may be excessive, in the sense that it will allow the objects to cool below a threshold above which the material can be easily and reliably worked. This applies, for example, to crystal polystyrene, which becomes rapidly vitreous after thermoforming, and it is therefore important that any processing subsequent to thermoforming, in particular the curling of objects such as beakers, glasses, cups and the like, which involves plastic deformation of the edges of these objects, should take place rapidly, but this also applies to other types of processing such as drilling, labelling, sterilisation and the like, with the exception of stacking.

In addition to the abovementioned advantages for materials which stabilise rapidly after thermoforming, the fact of working on the thermoformed objects before they cool below the workability threshold would also be advantageous for other thermoformable materials, such as coextruded materials, polypropylene, polyesters, polyethylene and others, in that advantage may be taken of greater ease of processing, thus ensuring longer life for the tools used.

The principal object of this invention is to provide an extraction or withdrawal and processing apparatus through which a set of thermoformed objects can be removed from between the male and female dies of a thermoforming machine in order that one or more processes may be performed upon them during one or more cycles of the operation of the thermoforming machine immediately following that in which they were removed.

Another object of this invention is that the said extraction and processing apparatus should be designed to serve a thermoforming machine with a female die which is located either above or below the male die.

A further object of this invention is to provide extraction and processing apparatus of high reliability and productivity.

These and other objects which will be more apparent below are achieved by an extraction and processing apparatus for thermoformed objects from a thermoforming machine which apparatus comprises an extraction plate designed to move synchronously with the thermoforming machine between a withdrawal position in which a set of thermoformed objects are removed when the thermoforming machine is in the position in which the dies are open and at least one station for processing or handling the said objects during the remaining part of one or more complete cycles of the thermoforming machine.

Advantageously, the or each work station comprises a curling unit of any suitable type which is arranged to curt the objects which still retain heat when supported by the said extraction plate.

Further features and advantages of this invention will be more apparent from the following detailed description of some embodiments thereof which are given by way of non-limiting examples with reference to the appended drawings, in which:

FIG. 1 is a diagrammatic view in side elevation with parts in cross-section of thermoforming machine and a withdrawing apparatus for the extraction and processing of thermoformed objects serving the thermoforming machine and having its extraction plate which is moved to a unit for processing a set of thermoformed objects which have just been withdrawn from the thermoforming machine, FIG. 2 shows a detail of FIG. 1 on a magnified scale, FIG. 3 illustrates a view similar to that in FIG. 1, while the thermoforming machine is carrying out the remaining part of its working cycle, i.e. thermoforming of a successive set of objects, while the extraction and processing apparatus cooperates in performing processing of the objects of the immediately preceding set of objects, FIG. 4 shows a detail of FIG. 3 in cross-section and on a magnified scale, FIG. 5 illustrates in diagrammatic side elevation view with parts in cross-section the start of a new working cycle of both the thermoforming machine and the extraction and processing apparatus which serves it, FIG. 6 is a diagrammatic side elevation view with parts in cross-section which illustrates another embodiment of extraction and processing apparatus serving a thermoforming machine comprising two successive stations for processing the sets of objects while being supported and transported by an extraction plate which removes them from the thermoforming machine, FIGS. 7, 8 and 9 are views similar to that in FIG. 6 which illustrate the various successive stages in the processing of a set of objects supported and transported by an extraction plate which removes them from the thermoforming machine, FIG. 10 is a diagrammatic view from above of a thermoforming machine and the extraction and processing apparatus for sets of objects, which is provided with a pair objects removing, supporting and transporting plates which are designed to operate alternation, FIG. 11 shows a view in cross-section and on a magnified scale of a thermoformed object engaged with a corresponding former on an extraction suction plate on which the object can be curled, FIG. 12 is a view similar to that of FIG. 11 which illustrates a corresponding former provided with an elastic retaining ring which acts on the internal surface of the object, FIG. 13 is a view similar to that of FIG. 12 which illustrates a former provided with sucking means for holding a thermoformed object, and FIG. 14 shows a view in cross-section of a thermoformed object held in position on an extraction plate by retaining means which act on the outer surface of the object in order that a drilling operation may be performed on its base.

In the Figures in the appended drawings identical or similar parts or components have been identified by means of the same reference numerals.

With reference first of all to the embodiment illustrated in FIGS. 1 to 5, it will be rioted that an extraction and processing apparatus, generally indicated by 1, for objects 2 (in general hollow containers with a solid bottom such as beakers, trays, cups, coffee cups and the like) which have been thermoformed in a thermoforming machine or press 3 comprises an extraction plate 4 which is arranged to move synchronously with the thermoforming machine 3 between a withdrawal position in which it removes a set of thermoformed objects 2 when thermoforming machine 3 is in the position in which its dies are open (FIGS. 1 and 5) and a processing station 5 in which the entire set is processed or handled (FIGS. 1 and 2) during the remaining part of a complete cycle of thermoforming machine 4 served by, or co-operating with, extraction plate 1.

Thermoforming machine 3 is a press having either a single or a double female die 6a, which is for example located in the lower position, as is well known in the art, and a corresponding upper male die 6b, at least one of which is supported in such a way that it can move vertically so that the two dies can move together into a closed position and separate cyclically to a position in which they are open apart.

Female die or dies 6a are provided with a plurality of recesses 7 which are axially aligned with a respective plug 8 which is axially movably supported within male die 6b and designed to enter a recess 7 when the mould is closed (FIG. 3). Plugs 8 are each supported by a respective vertical control rod 9 which is connected at the top to control frame 10 by one or more actuating units, each comprising e.g. a linear actuator, such as a fluid-operated piston and cylinder unit 11.

Each recess 7 in the female die or dies 6a is also provided with a corresponding extractor/lifter 12, which is operated for example together with the others by means of a frame 13 by a suitable linear actuator 14 which is designed to lift a thermoformed object 2 formed therein above the corresponding recess 7 while the mould is being opened (FIG. 1).

Alongside dies 6a and 6b there are a pair of longitudinal members 15 of a feeder/conveyor, e.g. of the chain type, which is designed to feed a sheet of thermoformable material 16, from which the waste 17 after each moulding is moved upwards for removal from press 3.

Extraction plate 4 may be of any suitable type, e.g. as disclosed in Italian patent application VR94A000082 filed on the Sep. 9, 1994 in the name of the applicant, using either a negative pressure retaining effect on objects 2 of each moulding or mechanical securing means.

More particularly, extraction plate 4 is supported, e.g. in cantilever fashion, at one end of a supporting arm or arms 18, whose other end is connected to or is integral with a carriage or slide 19 mounted so as to slide or roll on guide means, generically indicated by 20, e.g. of the rack type controlled by a motor/reduction gear unit 21 which is designed to impart a back and forth cyclical movement, synchronously with the operating cycle of press 3, between the withdrawal position when dies 6a and 6b are open, and workstation 5 which is located in a position adjacent to the press.

Workstation 5 comprises a curling unit of any suitable type for curling objects 2 of a moulding which are still hot from the press, while the same are still supported by extraction plate 4.

To this end, workstation 4 has a plurality of seats 22 which receive and support the bottom of each object 2 from a moulding which are picked up by extraction plate 4. Each receiving seat 22 is supported at one end by a respective rod 23, the various rods 23 in seats 22 having their other ends fixed to a common frame 24 controlled by a linear actuator such as e.g. a fluid-operated piston and cylinder unit 25 which is designed to move them between an extended and a withdrawn position.

An annular member 26, one of whose frontal ends has an annular curling shape or contour 27 (FIG. 4), is longitudinally movable coaxially around the axis of each receiving seat 22 and the other end of the annular member 26 is fixed to a supporting plate 28, which has, in a position corresponding to each receiving seat, a through hole 29 of diameter such as to allow free passage through respective seat 22. The face of supporting plate 28 which faces frame 24 is connected to one or more suitable linear actuators, e.g. a pair of fluid-operated piston and cylinder units 30 supported by a supporting structure indicated generically by 31 which also mounts fluid-operated unit 25.

Supporting structure 31 may in turn be e.g. rotated by 90° around an axis 32 perpendicular to the direction of the axes of rods 23 through the action of a motor/reduction gear unit 33 (FIG. 5).

Appropriate curling formers 34, each of which can be inserted into a corresponding annular curling former or shaper 27 are provided on the face of extraction plate 4 which faces female die 6a and therefore workstation 5. These are designed first of all to engage the inside surface of the rim of a respective object 2 removed from female die 6a when plate 4 is in the extracting position and subsequently to cooperate with a corresponding annular member 26 which is thrust against these by fluid-operated units 30 to form the curled rim or edge of the object at workstation 5.

To oppose the thrust of fluid-operated units 30, extraction plate 4 lies alongside e.g. a carriage 35 at workstation 5, and this carriage, although overcoming the thrust during the curling or edging stage, does not constitute any obstacle to the travel of extraction plate 4 between the extraction position and workstation 5.

The operating sequence of the extraction means described above is quite simple. During the stage when dies 6a and 6b are open, extractors 12 release objects 2 of a moulding from the corresponding recesses 7 in the female die while extraction plate 4 begins its travel towards the extraction position (FIG. 5). When the press is fully open, objects 2 have already been inserted onto a corresponding edging former 34 and are transported to workstation 5, while at the same time waste 17 is removed and the press begins to close (FIG. 1).

Fluid-operated units 25 and 30 are actuated at workstation 5 to move seats 22 against the bases of objects 2 so that each object is deeply seated on its corresponding former 34 and to thrust annular members 26 along the objects in such a way that formers 27 are brought against and around the outer edge of objects 2 which are secured by corresponding formers 34 to act together with the latter in order to edge them or curl the edge by hot plastic deformation, making use of the hot workability of the thermoplastic material of which the objects are made and taking advantage of the residual thermoforming heat still retained in an appreciable amount (and in any event well above the thermal workability threshold) in objects 2, while the objects themselves are held secured to extraction plate 4 in the same mutual spacing or arrangement as in female die 6a (FIG. 3).

Once the edging operation is complete, objects 2 are released from extraction plate 4, e.g. by means of a respective jet of air or by other suitable releasing means, and are taken up by the receiving seats 22, and then through the action of fluid-operated unit 25 are removed from the extraction plate together with annular members 26 through the action of fluid-operated units 30 and following the rotation of structure 31 through 90° as a result of the action of motor/reduction gear unit 32 are delivered to a stacker, generically indicated by 36 in FIG. 5, in order to be stacked, as is usual in the art.

In the embodiment illustrated in FIGS. 6 to 9, workstation 5 is replaced by a double workstation, or an edging station 40 comprising a plurality of annular edging members 26 controlled e.g. by a fluid-operated unit 30 and e.g. a station 41 for drilling the bases of objects 2.

Thus, after picking up the objects, extraction plate 4 makes a first stop with objects 2 attached to it at workstation 40 where all the set of objects are edged while they are still attached to extraction plate 4 (FIGS. 6 and 7) and a second stop at drilling station 41 where a plurality of tools 42 (one for each object 2 in the stamped set) drills the base of the objects as a result of the thrust from a linear actuator such as a fluid-operated unit 43 (FIGS. 8 and 9).

After drilling, extraction plate 4 releases objects 2 and returns to the extraction position to begin another working cycle. Drilled objects 2 are in turn removed from workstation 41 in a suitable way in order to be stacked or otherwise handled.

FIG. 10 illustrates an embodiment in which a press 3 is served by two extraction plates 4a and 4b which move alternately into the extraction position and hold objects 2 of a moulding secured to them so that three successive handling or processings of the objects immediately after they are removed from the mould while they remain secured to them throughout all three operations.

To this end, each extraction plate 4a and 4b is carried at the end of a corresponding supporting arm 45 whose other end is fixed on a pin member 46 whose longitudinal axis is perpendicular to the plane in which the corresponding extraction plate lies. Pin member 46 is controlled by an actuating unit, e.g. a motor/reduction gear unit 47, so as to perform angular movements to move the corresponding extraction plate between an extracting position and a first working station, e.g. an edging or curling station 40. Each motor/reduction gear unit 47 with corresponding member 46 is movably mounted so as to move on a guide 48 and is caused to move along it by means of a linear actuator comprising e.g. a length of chain 49 driven by a motor/reduction gear unit 50.

With this arrangement each extraction plate 4a, 4b is arranged to move into the extraction position to pick up a set or moulding of objects 2 from female die 6a, to transfer the objects to a first workstation 40 through rotation of its respective arm 45, and then by moving along the respective guide 48 it is displaced subsequently to a second workstation, e.g. a drilling station 43, while the other extraction plate moves into the extraction position, and to a third workstation, e.g. an external labelling or marking station 51.

FIGS. 11 to 14 illustrate different embodiments of extraction plate 4.

FIG. 11 shows an extraction plate 4 equipped with formers or plugs 34 each of which has a peripheral shoulder 52 against which the edge of a thermoformed object 2 may abut. Each former 34 has one or more axial holes 53a in communication with main holes 53b, e.g. provided in the body of extraction plate 4, which can be placed in communication with a suction pump 56 operated by an electric motor 57 through a duct 54 which can be shut off by e.g. an electrically-operated valve 55.

When during the extraction stage plate 4 moves at objects 2, formers 34 are placed in communication with suction pump 56 to promote partial insertion of each object, seating it against shoulder 52 of its respective former. Once objects 2 have been transferred to each workstation electrical valve 55 is controlled e.g. by a programmed control unit, which is not shown in the drawings, which places duct 54 in communication with the surrounding atmosphere and thus brings an end to the retaining action exerted by the negative pressure previously created within each object, as a result of which the objects can be released and removed from holding plate 4.

In the embodiment illustrated in FIG. 12 the shoulder 52 of each plug or former 34 is provided with an annular groove 58 which acts as a seat for a resilient lip seal 59 which is designed to removably engage the inner surface of objects 2. In this case there is no need to create a negative pressure within objects 2 in order to retain them on their respective plugs and pump 56 will be of the pressure type to send a blast of air at the end of the processing operation of the objects, in order to remove them from extraction plate 4.

The embodiment illustrated in FIG. 13 provides means for holding objects 2 on respective plugs 34 which comprise one or more suction cups 60 seated in a frontal recess 61 in each respective plug or former 34 and which can move against the loading force of a spring 62. Each suction cup is in communication with a pump 56 in a way entirely similar to the embodiment in FIG. 11.

Below object 2 held on extraction plate 4 there is shown a plate 70 which can move towards and away from an object 2 which is designed to place a label, generically indicated by 71, on the outside of the base.

FIG. 14 illustrates an embodiment of means for retaining objects 2 on respective formers 34 comprising at least two projections 63 cantilevered out from a respective control member 64 which is rotatably mounted in extraction plate 4 and which can be controlled (e.g. by a rack mechanism which can be operated by a suitable linear actuator, as generally indicated by 66) in order to make partial angular movements in both directions thereby moving the corresponding projections either towards shoulder 52 of a former into an engaging position or away from shoulder 52 into a disengaged position. This arrangement is particularly advantageous for holding objects 2 onto extraction plate 4 from the outside. The drawing diagrammatically illustrates a unit 41 for drilling the base of the objects in which each former also supports a corresponding head 65 provided with axial holes corresponding to each hole which has to be made the bases of the objects which is designed to bear against the bases of the objects to act as a thrust plate in order to prevent deformation of the bases of the objects and to act as a guide for the drilling bits.

It will be noted that the extraction and processing apparatus as described above make it possible to perform one or more processes on a set or moulding of thermoformed objects easily and reliably during one or more thermoforming cycles of a thermoforming machine immediately subsequent to removal from the press.

The extraction and processing apparatus described above may be subject to many modifications and variations within the scope of the protection defined by the claims.

Thus for example the same apparatus may also serve a press in which the female die is mounted above and the male die is mounted below, where both dies move along a horizontal plane.

What is claimed is:

1. An apparatus for extracting and processing thermoformed objects from a thermoforming machine, comprising at least one station for processing thermoformed objects produced in the thermoforming machine, said apparatus being arranged in sequence immediately downstream of the thermoforming machine and upstream of a stacking station for said thermoformed objects, said apparatus including at least one extraction plate which moves synchronously with the thermoforming machine between a position in which it picks up a multiplicity of objects thermoformed by the thermoforming machine and the at least one processing station and holds them secured to it during each processing operation, a supporting arm rigid with an end of the at least one extraction plate, a carriage or slide means which is connected to another end of the supporting arm, guide means for the carriage or slide means, and actuating means for the carriage or slide means acting synchronously with an operating cycle of the thermoforming machine.

2. An apparatus according to claim 1, wherein the carriage or slide means comprises a hinge pin for the supporting arm and actuation means to cause the supporting arm to effect angular movements.

3. An apparatus according to claim 1, comprising a thrust resisting means at the at least one processing station, said extraction plate being movably arranged alongside said thrust resisting means to oppose lateral processing thrusts applied to the objects.

4. An apparatus according to claim 2, wherein the at least one processing station includes an edging unit which is mounted on a support and has actuation means to cause angular movement thereof about an axis.

5. An apparatus according to claim 2, wherein the at least one processing station comprises a unit for drilling the bases of the objects.

6. An apparatus according to claim 1 in which the at least one processing station includes a unit for labelling or marking the objects.

7. An apparatus according to claim 1, in which the at least one processing station includes a unit for sterilizing the objects.

8. A method for extracting and processing thermoformed objects from a thermoforming machine in an apparatus including stations for processing and/or treating thermoformed objects produced in the thermoforming machine arranged in sequence immediately downstream of the thermoforming machine and having at least one extraction plate, the method comprising the steps of:

moving the at least one extraction plate synchronously with the thermoforming machine between a position in which it picks up a plurality of objects thermoformed by the thermoforming machine and at least one processing and/or treating station for the thermoformed objects thus removed, and holding the plurality of objects secured to the at least one extraction plate during a downstream curling operation for curling edges of the objects while the objects are still hot from their thermoforming and held by said at least one extraction plate.

9. A method according to claim 8, in which said extraction plate has a former or seat for each object to be removed and processed and/or treated on a side thereof facing the objects.

10. A method according to claim 9, wherein a extraction arm is provided for the at least one extraction plate which at one end thereof supports the at least one supporting plate, a carriage or slide which is connected to or integral with the supporting arm so as to move the at least one extraction plate, the method further including the step of:

actuating said carriage or slide synchronously with an operating cycle of the thermoforming machine.

11. A method according to claim 10, in which the carriage or slide includes a hinge pin for the supporting arm of its respective extraction plate and further including the step of actuating the supporting arm to cause the arm to effect angular movements.

12. A method according to claim 9, in which said extraction plate opposes lateral processing thrusts applied to the objects by thrust resisting means.

13. A method according to claim 9, further including an edging or curling unit for the curling operation arranged to edge hot objects attached to the at least one extraction plate in co-operation with the corresponding formers or seats.

14. A method according to claim 13, in which the edging unit has a plurality of receiving and supporting seats for the base or bottom of each object in said plurality of objects, a supporting arm for each receiving seat, a connecting frame among the supporting arms, an actuator designed to move the frame between a position close to the at least one extraction plate and one far or away from it, an annular member which moves coaxially and around each receiving seat and has a frontal end bearing an annular edging former or seat which acts together with a respective former on the at least one extraction plate, and a supporting plate to which the other end of each annular member is fixed or is integral with and having an opening corresponding to each receiving seat to allow a corresponding receiving seat to pass through it.

15. An apparatus according to claim 1, wherein said at least one processing station includes an edging or curling unit which has a plurality of receiving and supporting seats for the base or bottom of each object in said multiplicity of objects, a supporting arm for each receiving seat, a connecting frame among the supporting arms, an actuator designed to move the frame between a position close to the extraction plate and one far away from it, an annular member which moves coaxially and around each receiving seat and has a frontal end bearing an annular edging former or seat which is arranged to act together with a respective former on the extraction plate, and a supporting plate to which the other end of each annular member is fixed or is integral with and has an opening corresponding to each receiving seat to allow a corresponding receiving seat to pass through it, and actuator means for moving the supporting plate.

16. A method for extracting and processing thermoformed objects from a thermoforming machine, the thermoforming machine being upstream from at least one station for processing and/or treating thermoformed objects produced in the thermoforming machine, the method comprising the steps of:

moving at least one extraction plate synchronously with the thermoforming machine between (i) a position in which the at least one extraction plate picks up at least one object thermoformed from the thermoforming machine and (ii) the at least one processing and/or treating station for the thermoformed objects; and holding the at least one object while still hot from thermoforming by the at least one extraction plate during a downstream curling operation and thereby facilitating curling at least one edge of the at least one object during the downstream curling operation.

* * * * *